(12) United States Patent
Takeuchi

(10) Patent No.: US 11,292,099 B2
(45) Date of Patent: Apr. 5, 2022

(54) DUST COLLECTING SYSTEM

(71) Applicant: MAKITA CORPORATION, Anjo (JP)

(72) Inventor: Hajime Takeuchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 267 days.

(21) Appl. No.: 16/808,848

(22) Filed: Mar. 4, 2020

(65) Prior Publication Data

US 2020/0290167 A1 Sep. 17, 2020

(30) Foreign Application Priority Data

Mar. 14, 2019 (JP) .............................. JP2019-047012

(51) Int. Cl.
*B23Q 11/00* (2006.01)
*B25D 17/20* (2006.01)

(52) U.S. Cl.
CPC ...... *B23Q 11/0071* (2013.01); *B23Q 11/0046* (2013.01); *B25D 17/20* (2013.01)

(58) Field of Classification Search
CPC ............ B23Q 11/0046; B23Q 11/0071; B25D 17/20; B25F 5/003
See application file for complete search history.

(56) References Cited

U.S. PATENT DOCUMENTS

| | | | |
|---|---|---|---|
| 8,997,887 B2 * | 4/2015 | Furusawa .......... | B23Q 17/2404 173/198 |
| 9,776,296 B2 * | 10/2017 | Brewster .................. | B25F 5/02 |
| 10,799,996 B2 * | 10/2020 | Furusawa .......... | B23Q 11/0071 |
| 2011/0308830 A1 * | 12/2011 | Furusawa ............... | B25F 5/003 173/198 |
| 2017/0355053 A1 * | 12/2017 | Furusawa .......... | B23Q 11/0071 |
| 2018/0085873 A1 * | 3/2018 | Rompel .................. | B28D 7/02 |

FOREIGN PATENT DOCUMENTS

| | | |
|---|---|---|
| JP | 5357897 B2 | 12/2013 |
| JP | 2017-221986 A | 12/2017 |

* cited by examiner

*Primary Examiner* — Andrew M Tecco
(74) *Attorney, Agent, or Firm* — Oliff PLC

(57) ABSTRACT

A dust collecting system includes a power tool and a dust collector. The dust collector includes a body, a sliding part, a biasing member, a lock member and an actuator. The body is configured to be removably attached to the power tool. The sliding part is held by the body so as to be slidable along a sliding axis. The biasing member is configured to bias the sliding part forward to hold the sliding part in a first position. The lock member is configured to lock the sliding part relative to the body in a second position. The actuator is configured to unlock the sliding part locked by the lock member, by operating in response to a motor-starting operation for the power tool by a user.

20 Claims, 8 Drawing Sheets

US 11,292,099 B2

DUST COLLECTING SYSTEM

CROSS-REFERENCE TO RELATED APPLICATION

The present application claims priority to Japanese patent application No. 2019-47012 filed on Mar. 14, 2019, contents of which are fully incorporated herein by reference.

TECHNICAL FIELD

The present disclosure relates to a dust collecting system including a power tool and a dust collector.

BACKGROUND ART

A dust collecting system is known which includes a power tool configured to perform a processing operation on a workpiece by driving a tool accessory and a dust collector configured to be attached to the power tool to collect dust generated by the processing operation. Generally, the dust collector has a cover part which can cover a tip end of the tool accessory. Normally, the cover part is biased in a forward direction of the dust collector and held in a specified position (e.g. a position to cover the tip end of the tool accessory). A user may, however, want to lock the cover part in a position different from the specified position before starting a processing operation, for example, in order to accurately position the tip end of the tool accessory on a target position of a workpiece. Accordingly, for example, Japanese patent No. 5357897 provides a dust collecting system which has a lock member configured to lock the cover part in a position different from a specified position and a lock-release member configured to release the lock in response to an operation of the operation member. The operation member is provided in the vicinity of a grip part of the power tool.

SUMMARY

The present disclosure provides a dust collecting system which includes a power tool and a dust collector. The power tool is configured to perform a processing operation by driving a removably coupled tool accessory by power of a motor. The dust collector is configured to collect dust generated by the processing operation.

The dust collector includes a body, a sliding part, a biasing member, a lock member and an actuator. The body is configured to be removably attached to the power tool. The sliding part is held by the body so as to be slidable along a sliding axis. The sliding axis defines a front-rear direction of the dust collector. The sliding part has a front end portion provided with a cover part. The cover part has a suction port for dust and is configured to cover a tip end of the tool accessory. The biasing member is configured to bias the sliding part forward to hold the sliding part in a first position. The lock member is configured to lock the sliding part relative to the body in a second position, which is rearward of the first position. The actuator is configured to unlock the sliding part locked by the lock member, by operating in response to a motor-starting operation for the power tool by a user.

DETAILED DESCRIPTION OF THE EMBODIMENTS

Figure 1:
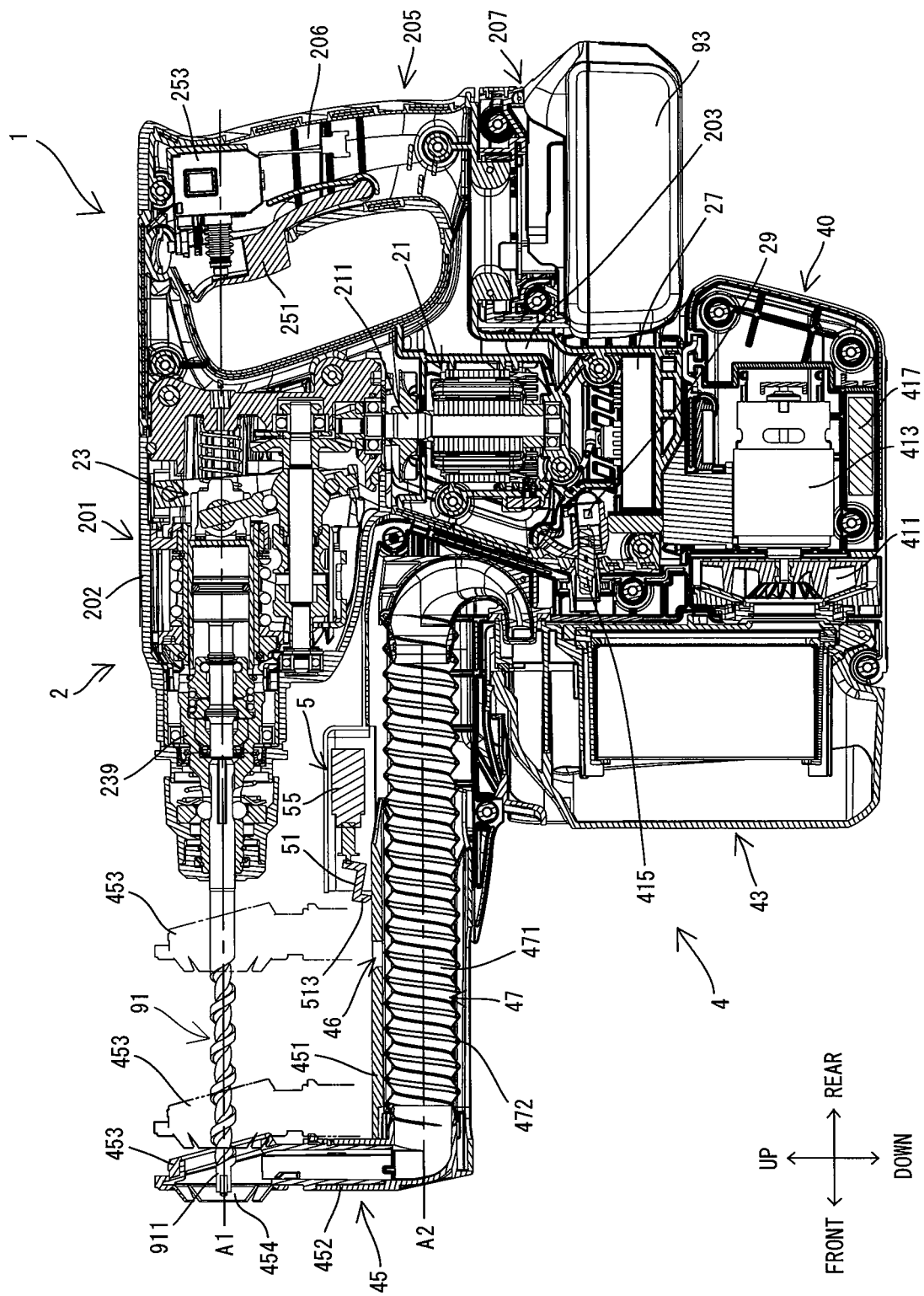
FIG. 1 is a sectional view showing a dust collecting system in a state that a sliding part is located in a frontmost position.

A dust collecting system 1 according to an embodiment is now described with reference to the drawings. As shown in FIG. 1, the dust collecting system 1 of the present embodiment includes a hammer drill 2 and a dust collector 4. The hammer drill 2 is configured to perform a processing operation (such as a drilling operation and a chipping operation) by driving tool accessory 91, which is removably coupled to the hammer drill 2, by power of a motor 21. More specifically, the hammer drill 2 is configured to perform hammering motion of linearly driving the tool accessory 91 along a driving axis A1 and also configured to perform drilling motion of rotationally driving the tool accessory 91 around the driving axis A1. The chipping operation is performed by the hammering motion and the drilling operation is performed by the drilling motion. Further, the dust collector 4 is configured to be removably attached to the hammer drill 2 and configured to collect dust generated by the processing operation.

First, the general structure of the hammer drill 2 is described with reference to FIG. 1.

As shown in FIG. 1, an outer shell of the hammer drill 2 is mainly formed by a body housing 201 and a handle 205. The body housing 201 mainly includes a driving-mechanism-housing part 202 which houses a driving mechanism 23, and a motor-housing part 203 which houses the motor 21, and is generally L-shaped in a side view as a whole.

The driving-mechanism-housing part 202 is formed as an elongate box-like body and extends along the driving axis A1. A tool holder 239, to which the tool accessory 91 can be coupled, is disposed within one end portion of the driving-mechanism-housing part 202 in a direction of the driving axis A1. The motor-housing part 203 is formed as an elongate box-like body and protrudes in a direction away from the driving axis A1 from the other end portion of the driving-mechanism-housing part 202 in the direction of the driving axis A1. The motor 21 is disposed within the motor-housing part 203 such that a rotation axis of a motor shaft 211 extends in a direction orthogonal to the driving axis A1.

In the following description, for convenience sake, an axial direction of the driving axis A1 (also referred to as the driving-axis-A1 direction) is defined as a front-rear direction of the hammer drill 2. In the front-rear direction, the one end side on which the tool holder 239 is provided is defined as a front side (also referred to as a front-end-region side) of the hammer drill 2. While its opposite side is defined as a rear side. Further, a direction which is orthogonal to the driving axis A1 and which corresponds to a direction of the rotation axis of the motor shaft 211 is defined as an up-down direction of the hammer drill 2. In the up-down direction, a direction toward which the motor-housing part 203 protrudes is defined as a downward direction, while its opposite direction is defined as an upward direction. Furthermore, a direction which is orthogonal to both the front-rear direction and the up-down direction is defined as a left-right direction.

The handle 205 is generally C-shaped in a side view as a whole and connected at both ends to a rear end portion of the body housing 201. The handle 205 includes a pip part 206 designed to be held by a user. The grip part 206 is arranged apart rearward from the body housing 201. The grip part 206 extends generally in the up-down direction crossing the driving axis A1. A trigger 251 is provided on a front side of an upper end portion of the grip part 206. The trigger 251 is configured to be depressed (pulled) by a user. The trigger 251 is an operation member for starting the motor 21. Further, a battery-mounting part 207 is provided on a lower end portion of the handle 205. The battery-mounting part 207 is configured such that a rechargeable battery (battery pack) 93 can be removably attached thereto as a power source for the motor 21.

The internal structure of the body housing 201 is now described.

As described above, the driving mechanism 23 is housed in the driving-mechanism-housing part 202. The driving mechanism 23 is configured to drive the tool accessory 91 by power of the motor 21. In the present embodiment, the driving mechanism 23 includes a motion-converting mechanism, a striking mechanism and a rotation-transmitting mechanism. The motion-converting mechanism is configured to convert rotation of the motor shaft 211 into linear motion and transmit it to a striking element. In the present embodiment, the motion-converting mechanism is of a type using a swinging member. The striking mechanism is configured to linearly operate to strike the tool accessory 91, thus linearly driving the tool accessory 91 along the driving axis A1. In the present embodiment, the striking mechanism includes a striker and an impact bolt. The rotation-transmitting mechanism is configured to decelerate rotation from the motor shaft 211 and then transmit it to the tool holder 239, thus rotationally driving the tool accessory 91. The rotation-transmitting mechanism includes a plurality of gears. An operation mode of the hammer drill 2 can be switched (among a hammer drill mode, a drill mode and a hammer mode) by a mode-switching mechanism (not shown) which is configured to interrupt power transmission in the motion-converting mechanism or in the rotation-transmitting mechanism, according to a user's operation of a mode-switching dial (not shown). The structures of the driving mechanism 23 and the mode-switching mechanism are known and therefore not described in detail herein.

As described above, the motor 21 is housed in the motor-housing part 203. A direct current (DC) brushless motor is employed as the motor 21. Further, a controller 27 is housed in the motor-housing part 203. The controller 27 is configured to control operation of the dust collecting system 1 (i.e. the hammer drill 2 and the dust collector 4). More specifically, the controller 27 is housed within a lower end portion of the motor-housing part 203. In the present embodiment, the controller 27 includes a control circuit, a three-phase inverter and a board mounted with them. The control circuit is formed by a microcomputer including a CPU, a ROM, a RAM and a timer. The three-phase inverter has a three-phase bridge circuit using six semiconductor switching elements. The three-phase inverter is configured to drive the motor 21 by switching each switching element of the three-phase bridge circuit according to a duty ratio indicated by a control signal outputted from the control circuit. Further, a recess is formed on the front side of a lower portion of the motor-housing part 203 to fix the dust collector 4. A connector 29 is provided in this recess. The connector 29 is configured to be electrically connected to a connector 415 of the dust collector 4.

The internal structure of the handle 205 is now described. As described above, the trigger 251 is provided on the upper end portion of the grip part 206. A switch 253 is housed adjacent to a rear side of the trigger 251 within the grip part 206. The switch 253 is normally kept in an off state and turned on in response to a depressing operation of the trigger 251 (an operation for starting the motor 21). The switch 253 is connected to the controller 27 via a wiring (not shown). In the present embodiment, the controller 27 is configured to control the operation of the dust collecting system 1 based on a signal which is outputted from the switch 253 and which indicates the on/off state.

Next, the general structure of the dust collector 4 is described. When the dust collector 4 is used, the dust collector 4 is attached to the hammer drill 2. Therefore, in the following description, for convenience sake, directions of the dust collector 4 are defined corresponding to the directions of the hammer drill 2 with the dust collector 4 attached thereto.

As shown in FIG. 1, the dust collector 4 includes a body housing 40, a dust case 43, a sliding part 45 and a dust-transfer passage 47. The body housing 40 is configured to be removably attached to the body housing 201 of the hammer drill 2. The body housing 40 houses a fan 411 and a motor 413. The fan 411 is configured to generate an air flow for collecting dust. The motor 413 is configured to rotationally drive the fan 411. The dust case 43 is a container for storing dust. The dust case 43 is removably mounted to the body housing 40. The sliding part 45 is held by the body housing 40 so as to be slidable in the front-rear direction along a sliding axis A2 which is parallel to the driving axis A1. Further, the sliding part 45 has a cover part 453. The cover part 453 has a suction port 454 for sucking dust and is configured to cover a tip end 911 of the tool accessory 91. The dust-transfer passage 47 is a passage through which dust sucked through the suction port 454 may be transferred, and extends through the inside of the sliding part 45 and is connected to the dust case 43.

In the present embodiment, the motor 21 of the hammer drill 2 and the motor 413 of the dust collector 4 may be driven in response to an operation of depressing the trigger 251 of the hammer drill 2. When the motor 413 is driven and the fan 411 is rotated, dust generated by the processing operation may be sucked in through the suction port 454 together with air and led into the dust case 43 through the dust-transfer passage 47. In the dust case 43, only the dust may be separated from the air and stored. The air from which the dust has been separated may be discharged from outlets (not shown) formed in the body housing 40. Thus, in the dust collecting system 1, the dust collector 4 can collect the dust generated by the processing operation using the hammer drill 2.

The detailed structure of the dust collector 4 is now described.

Figure 2:
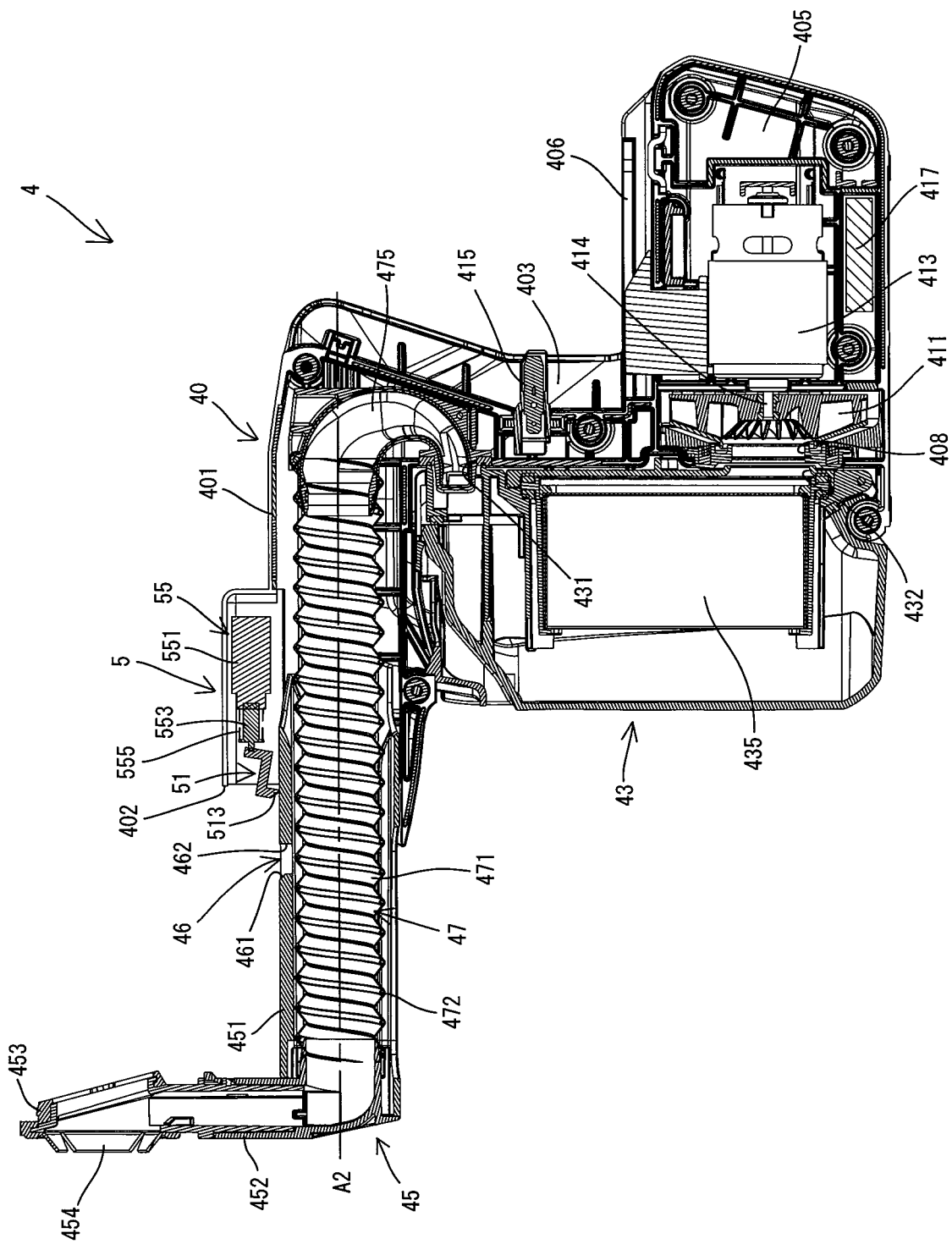
FIG. 2 is a sectional view of a dust collector.

First, the detailed structure of the body housing 40 and its internal structure are described. As shown in FIG. 2, the body housing 40 is a hollow body which is generally Z-shaped in a side view. The body housing 40 includes a sliding-guide part 401, a connector part 403 and a motor-housing part 405.

The sliding-guide part 401 is a rectangular box-like portion which forms an upper end portion of the body housing 40. The sliding-guide part 401 has an internal space extending in the front-rear direction. An opening 402 is provided on a front end of the sliding-guide part 401 to provide communication between the internal space and the outside. The sliding-guide part 401 is configured to hold the sliding part 45 such that the sliding part 45 is slidable in the front-rear direction along the sliding axis A2. More specifically, a pair of right and left guide grooves are formed on the inside of the sliding-guide part 401. The guide grooves extend in the front-rear direction. The sliding part 45 has a pair of right and left protrusions extending in the front-rear direction. The protrusions are slidingly engaged with the guide grooves. These structures are well-known and therefore not shown. With such structures, the sliding part 45 is slidably held in the front-rear direction relative to the body housing 40.

Further, a lock mechanism 5 is housed in an upper front end portion of the sliding-guide part 401. The lock mechanism 5 is configured to lock and unlock the sliding part 45 relative to the body housing 40 at a specific position in the front-rear direction. The detailed structure of the lock mechanism 5 will be described below.

The connector part 403 is provided on a lower side of a rear end portion of the sliding-guide part 401, and extends in the up-down direction. A rear wall of the connector part 403 has a protrusion protruding rearward. The connector 415 is provided in the protrusion. The connector 415 can be electrically connected to the connector 29 (see FIG. 1) of the hammer drill 2.

The motor-housing part 405 is a rectangular box-like portion which is provided on a lower side of the connector part 403, and extends rearward relative to the connector part 403. The motor-housing part 405 forms a lower end portion of the body housing 40. A pair of guide rails 551 are respectively formed on upper ends of right and left sides of the motor-housing part 405. The guide rails 551 extend in the front-rear direction. Correspondingly, a pair of guide grooves, which extend in the front-rear direction, are respectively formed in lower end portions of right and left side surfaces of the motor-housing part 203 of the hammer drill 2. The structure of such guide grooves are well-known, and therefore not shown in detail. The dust collector 4 may be attached to the body housing 201 of the hammer drill 2 via sliding engagement between the guide rails 406 and the guide grooves. Further, as shown in FIG. 1, when the dust collector 4 is moved rearward relative to the body housing 201 with the guide rails 406 engaged with the guide grooves and is placed at a specified position, the protrusion of the connector part 403 is fitted in the recess of the motor-housing part 203 and the connector 415 is electrically connected to the connector 29.

The motor-housing part 405 houses the motor 413, a circuit board (not shown) connected to the connector 415, the fan 411 and a controller 417. More specifically, as shown in FIG. 2, the motor 413 is arranged such that the motor shaft 414 extends in the front-rear direction. In the present embodiment, a DC motor with a brush is employed as the motor 413. When the dust collector 4 is attached to the body housing 201 as described above, driving current can be supplied from the battery 93 to the motor 413 via an energization path formed on the circuit board. The fan 411 is fixed to the motor shaft 414 in front of a body part (a stator and a rotor) of the motor 413 and rotates together with the motor shaft 414. The fan 411 is a centrifugal fan, An opening 408 is formed in a front wall of the motor-housing part 405 so as to face a suction area of the fan 411. The controller 417 is disposed beneath the motor 413.

The structure of the dust case 43 is now described. As shown in FIG. 2, in the present embodiment, the dust case 43 is a rectangular box-like container. The dust case 43 has an inlet 431 and an outlet 432. The air which contains dust flows in through the inlet 431, and the air from which the dust has been separated flows out through the outlet 432. The inlet 431 and the outlet 432 are formed in an upper rear end portion and a lower rear end portion of the dust case 43, respectively. The outlet 432 is formed in a position to communicate with the opening 408 of the motor-housing part 405. Further, a filter 435 is disposed within the dust case 43. The filter 435 is formed of an air-permeable material such as paper and nonwoven fabrics. The filter 435 is configured to separate the dust from the air when the air led into the dust case 43 from the inlet 431 passes through the filter 435. The air which has passed through the filter 435 flows out of the dust case 43 into the motor-housing part 405 via the outlet 432 and the opening 408 and is discharged to the outside of the dust collector 4 from the outlets (not shown).

The structure of the sliding part 45 is now described. As shown in FIG. 2, the sliding part 45 is a tubular member which is generally L-shaped in a side view as a whole. The sliding part 45 includes a first tubular part 451 and a second tubular part 452. The first tubular part 451 linearly extends in the front-rear direction. The second tubular part 452 extends upward from a front end portion of the first tubular part 451. The cover part 453 is provided on an upper end of the second tubular part 452 and configured to cover the tip end 911 of the tool accessory 91 (see FIG. 1). The cover part 453 has the suction port 454, which extends through the cover part 453 in the front-rear direction. The sliding part 45 is held by the body housing 40 such that the first tubular part 451 is always partly disposed within the sliding-guide part 401, while the second tubular part 452 (including the cover part 453) protrudes forward from the opening 402.

In the present embodiment, the sliding part 45 is configured to be movable relative to the body housing 40 in the front-rear direction between a frontmost position and a rearmost position which are respectively shown by a solid line and a chain line in FIG. 1. The frontmost position refers to a position where the sliding part 45 is located when the cover part 453 is located in a frontmost position relative to the body housing 40 in the front-rear direction. The frontmost position can also be paraphrased as a position where the sliding part 45 is located when the protruding length of the sliding part 45 from the body housing 40 is maximum. The rearmost position refers to a position where the sliding part 45 is located when the cover part 453 is located in a rearmost position relative to the body housing 40 in the front-rear direction (that is, when the sliding part 45 is pushed rearward into the body housing 40 to the maximum extent). The frontmost position is set to a position where the tip end 911 of the tool accessory 91 coupled to the hammer drill 2 is covered by the cover part 453.

Further, in the present embodiment, the sliding part 45 is configured to be locked relative to the body housing 40 in a specific position between the frontmost position and the rearmost position, which will be described in detail below. For this purpose, a recess 46 is formed in the sliding part 45 to be engaged with the lock member 51 of the lock mechanism 5. In the present embodiment, the recess 46 is formed as a through hole extending through an upper wall of the first tubular part 451. The recess 46 is formed, in the upper wall of the first tubular part 451, in a position to be exposed forward of the opening 402 of the body housing 40 when the sliding part 45 is located in the frontmost position. Further, as shown in FIG. 2, a face of the recess 46 which defines a front end of the recess 46 includes an inclined face 461 which is inclined rearward and downward. A face of the recess 46 which defines a rear end of the recess 46 is an orthogonal face 462 which is generally orthogonal to the sliding axis A2.

The dust-transfer passage 47 is now described. As shown in FIG. 2, the dust-transfer passage 47 is configured to extend through the inside of the sliding part 45 and connect the suction port 454 and the inlet 431 of the dust case 43. Dust sucked in from the suction port 454 may be transferred to the dust case 43 through the dust-transfer passage 47. In the present embodiment, the dust-transfer passage 47 is defined by a portion (the second tubular part 452) of the sliding part 45, a hose 471 and a hose-connecting part 475. The hose 471 is formed in a bellows shape to be extensible. One end of the hose 471 is connected to a lower end of the second tubular part 452 of the sliding part 45. The other end of the hose 471 protrudes rearward from a rear end of the sliding part 45 and is connected to one end of the hose-connecting part 475. The hose-connecting part 475 is a tubular member bent in a U-shape in a side view. The one end of the hose-connecting part 475 faces forward and is connected to the hose 471. The other end of the hose-connecting part 475 is fitted in a through hole formed in a front wall of the body housing 40 and inserted into the dust case 43 through the inlet 431. With this structure, the dust-transfer passage 47 is formed to connect the suction port 454 and the dust case 43.

Further, in the present embodiment, a spring 472 is fitted on the hose 471. A compression coil spring is employed as the spring 472. The sliding part 45 is always biased in a direction to protrude from the body housing 40 (i.e. biased forward) by the elastic force of the spring 472. Therefore, the sliding part 45 is held in the frontmost position while no external rearward force is applied to the sliding part 45 (hereinafter also referred to as an initial state).

Figure 3:
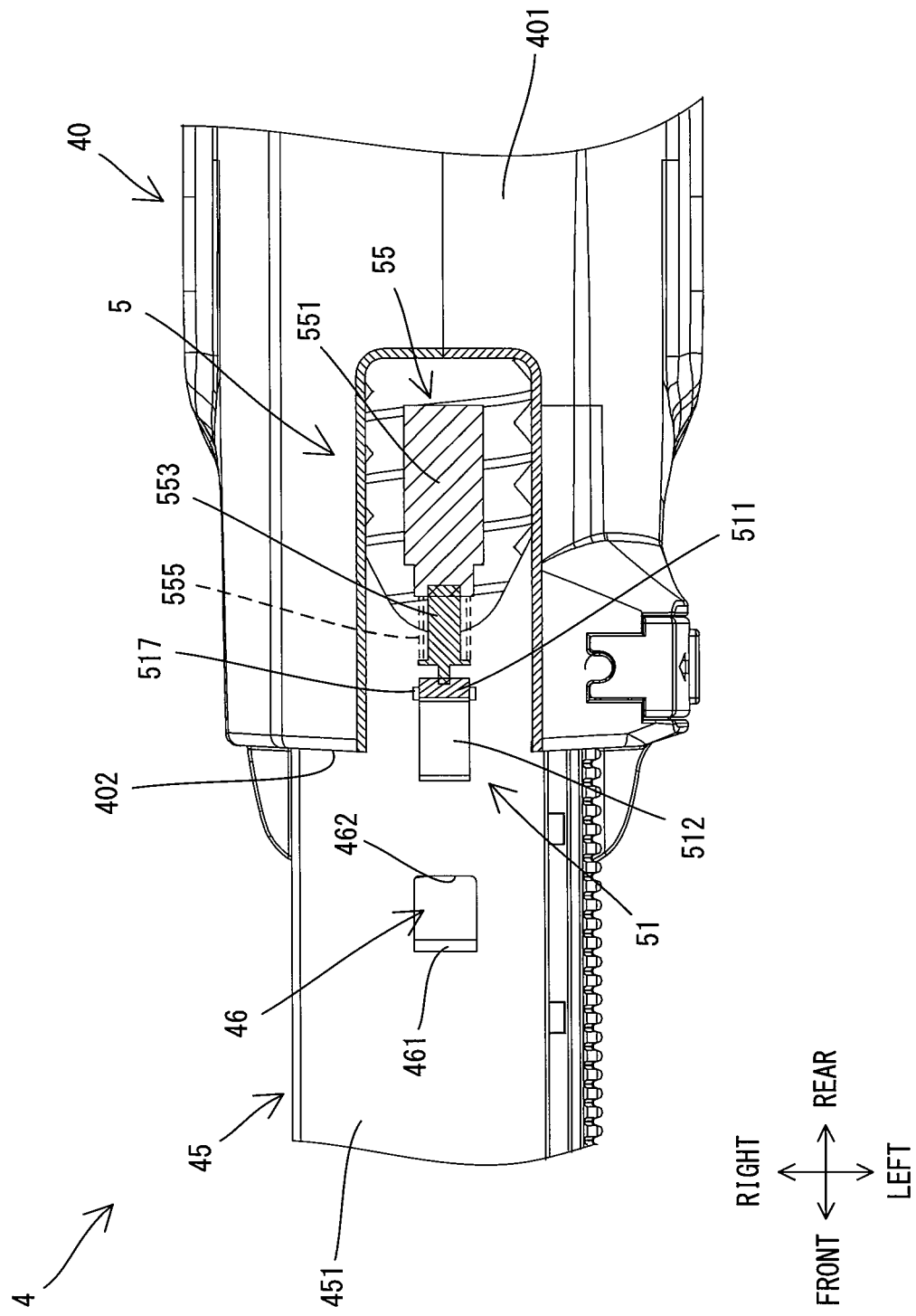
FIG. 3 is a sectional view of a lock mechanism of the dust collector.
Figure 4:
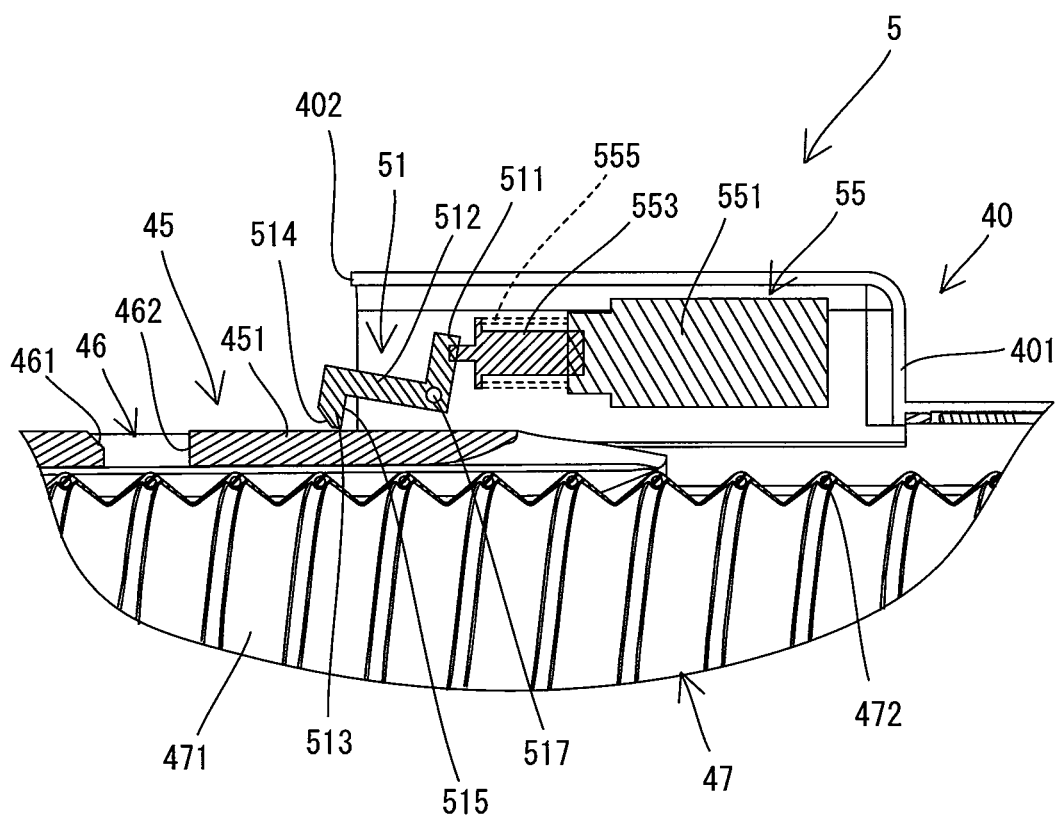
FIG. 4 is a partial, enlarged view of FIG. 2.

The lock mechanism 5 is now described. As shown in FIGS. 2 to 4, the lock mechanism 5 is disposed in a housing space formed in the upper front end portion of the sliding-guide part 401 of the body housing 40, and located above the first tubular part 451. The lock mechanism 5 includes the lock member 51 configured to be engaged with the sliding part 45 and a solenoid 55 configured to disengage the lock member 51 from the sliding part 45.

The lock member 51 is a rotary lever and is supported by the body housing 40 so as to be turnable around an axis extending in the left-right direction. More specifically, the lock member 51 is L-shaped in a side view, and includes a first part 511 and a second part 512. The second part 512 extends generally orthogonally to the first part 511 from one end of the first part 511. A projection 513 is formed on a distal end of the second part 512 (on the side opposite to the first part 511). The projection 513 protrudes in a direction opposite to the first part 511. The lock member 51 is supported by the body housing 40 via a pin 517 which is inserted through a bent part of the L-shaped lock member 51, such that the second part 512 extends generally forward and the projection 513 protrudes generally downward.

The solenoid 55 is a well-known electric component which is configured to convert electrical energy into mechanical energy of linear motion, by utilizing an electric field generated by energization of a coil. Although not shown in detail, the solenoid 55 includes a cylindrical case 551 for housing the coil and a plunger 553 which is linearly movable in an axial direction of the coil. The case 551 is fixed to the body housing 40 such that the axis of the plunger 553 extends parallel to the driving axis A1 (i.e. in the front-rear direction). A front end (protruding end) of the plunger 553 is pointed forward. The plunger 553 is biased forward by a spring 555. A compression coil spring is employed as the spring 555. The front end of the plunger 553 is pivotally connected to a distal end of the first part 511 of the lock member 51 (on the side opposite to the second part 512) via a pin (not shown) extending in the left-right direction. With such a structure, the solenoid 55 is capable of turning the lock member 51 along with movement of the plunger 553 in the front-rear direction.

The relationship between the lock member 51 and the position of the sliding part 45 relative to the body housing 40 is now described.

Figure 5:
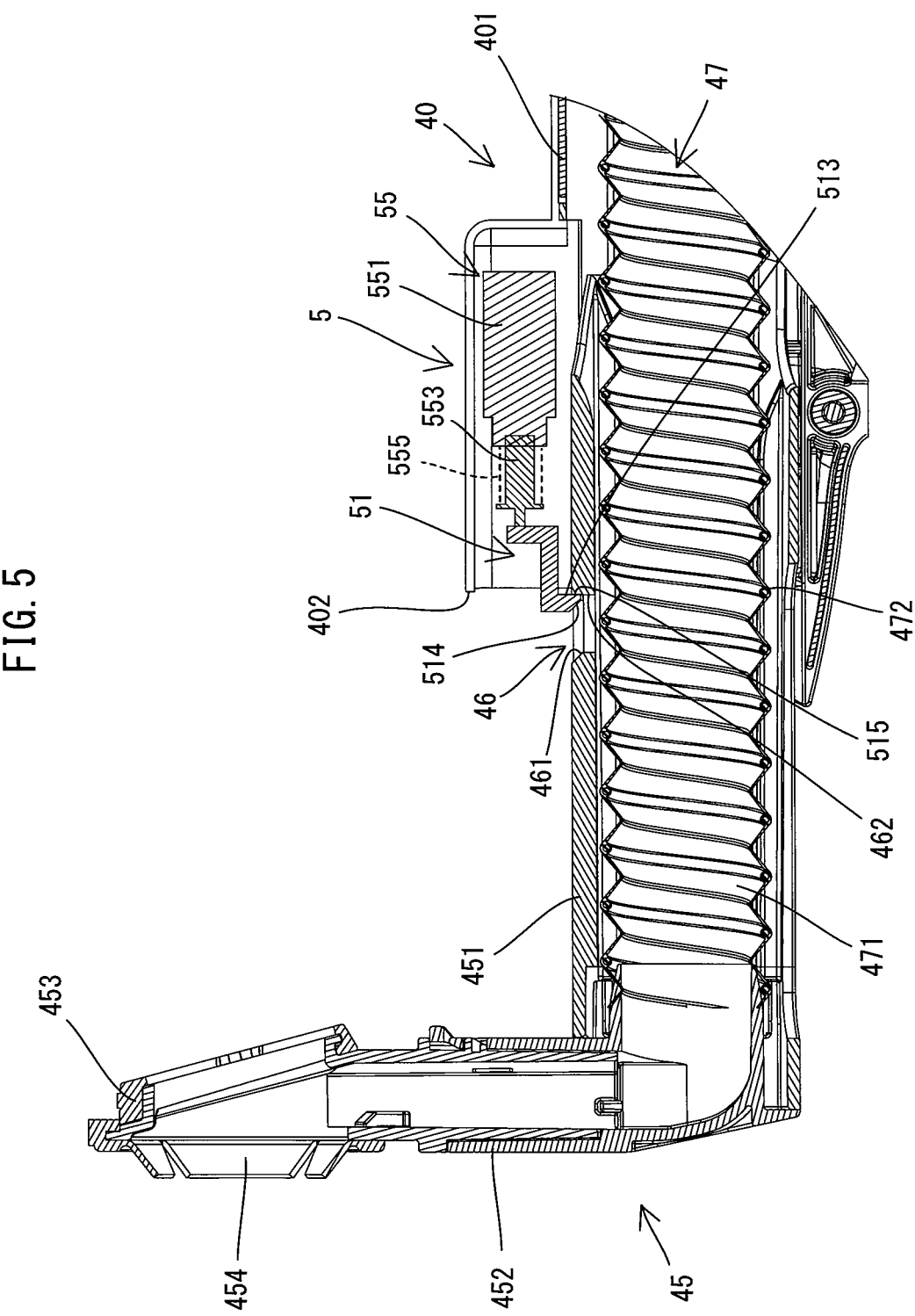
FIG. 5 is a partial sectional view of the dust collector in a state that the sliding part is located in an intermediate position and locked.

As shown in FIG. 5, when the sliding part 45 is placed rearward of the frontmost position, the recess 46 is located in a position corresponding to the projection 513 of the lock member 51, and the solenoid 55 is in an off state in which the solenoid 55 is not actuated (i.e. when the coil is not energized), the plunger 553 biased forward by the biasing force of the spring 555 is held in a frontmost position, and the lock member 51 is held in a position in which the projection 513 protrudes into the recess 46. A face of the projection 513 which faces forward in this position includes an inclined face 514 which is inclined forward and upward from a tip end of the projection 513. The inclined face 514 conforms to the inclined face 461 of the recess 46. Further, a face of the projection 513 which fixes rearward is formed as an orthogonal face 515 which is generally orthogonal to the longitudinal axis of the first tubular part 451.

The sliding part 45 is always biased toward by the spring 472 as described above. Therefore, when the projection 513 is placed in the recess 46, the orthogonal face 462 of the recess 46 abuts on the orthogonal face 515 of the projection 513, so that the sliding part 45 is prevented from moving forward relative to the body housing 40. Thus, the lock member 51 is engaged with the recess 46 and the sliding part 45 is locked relative to the body housing 40. Therefore, the position of the lock member 51 in which the projection 513 protrudes downward of a upper face of the first tubular part 451 is also referred to as a lock position. Further, the position of the sliding part 45 in which the lock member 51 is engaged with the recess 46 (i.e. in which the projection 513 is in the same position as the recess 46 in the front-rear direction) is also referred to as an intermediate position. As shown by a two-dotted chain line in FIG. 1, the intermediate position is set to a position in which the tip end 911 of the tool accessory 91 coupled to the hammer drill 2 protrudes forward of the cover part 453 (i.e. a position in which the tip end 911 is exposed to the outside in front of the cover part 453).

Figure 6:
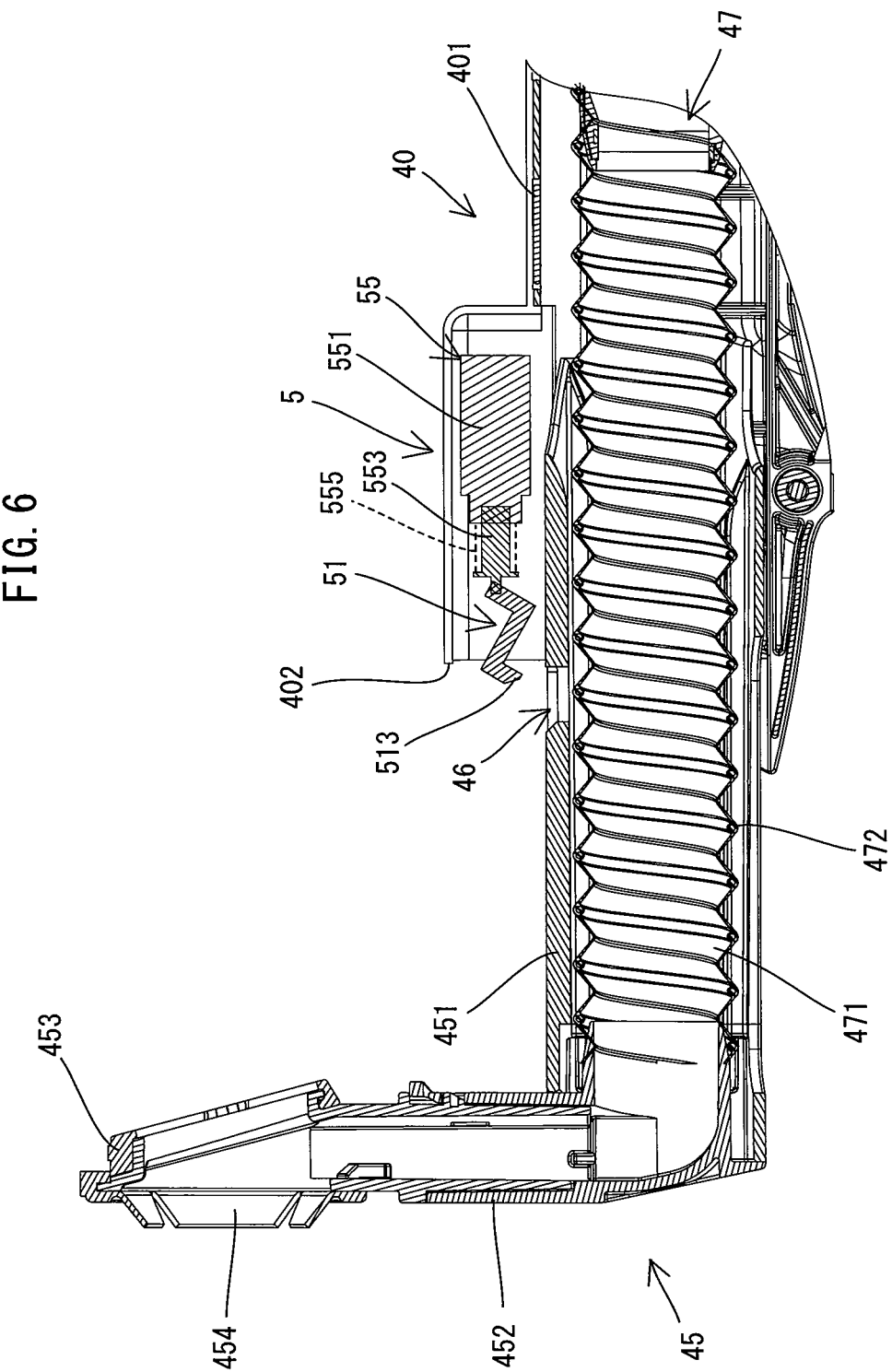
FIG. 6 is a partial sectional view of the dust collector in a state that the sliding part is located in the intermediate position and unlocked.

When the solenoid 55 is actuated to be turned on (i.e. when the coil is energized) with the sliding part 45 located in the intermediate position and locked by the lock member 51 in the lock position, as shown in FIG. 6, the plunger 553 moves rearward against the biasing force of the spring 555. Along with the rearward movement of the plunger 553, the lock member 51 turns in such a direction that the projection 513 moves upward (clockwise as viewed in FIG. 6). While the plunger 553 is moved to a rearmost position, the lock member 51 turns upward to a position in which the tip end of the projection 513 is apart upward from the upper face of the sliding part 45 (the first tubular part 451) (i.e. in a position where the projection 513 is not engageable with the recess 46 or in a position where the projection 513 does not interfere with the sliding part 45). In this process, the lock member 51 is disengaged from the recess 46, and the sliding part 45, which has been locked by the lock member 51, is unlocked. Accordingly, the sliding part 45, which is biased forward by the spring 472, returns to the frontmost position. Therefore, the position of the lock member 51 in which the projection 513 is apart upward from the upper face of the sliding part 45 (the first tubular part 451) is hereinafter also referred to as an unlock position.

In the present embodiment, the controller 27 of the hammer drill 2 controls operation of the solenoid 55. More specifically, as described above, when the dust collector 4 is attached to the hammer drill 2, the solenoid 55 is connected to the controller 27 via the connectors 415 and 29. The controller 27 can actuate the solenoid 55 by energizing the coil of the solenoid 55. In the present embodiment, the controller 27 is configured to actuate the solenoid 55 when the trigger 251 is depressed and the switch 253 is turned on, and to stop energization of the coil when a specified time elapses which is required for the plunger 553 to reach the rearmost position.

Figure 7:
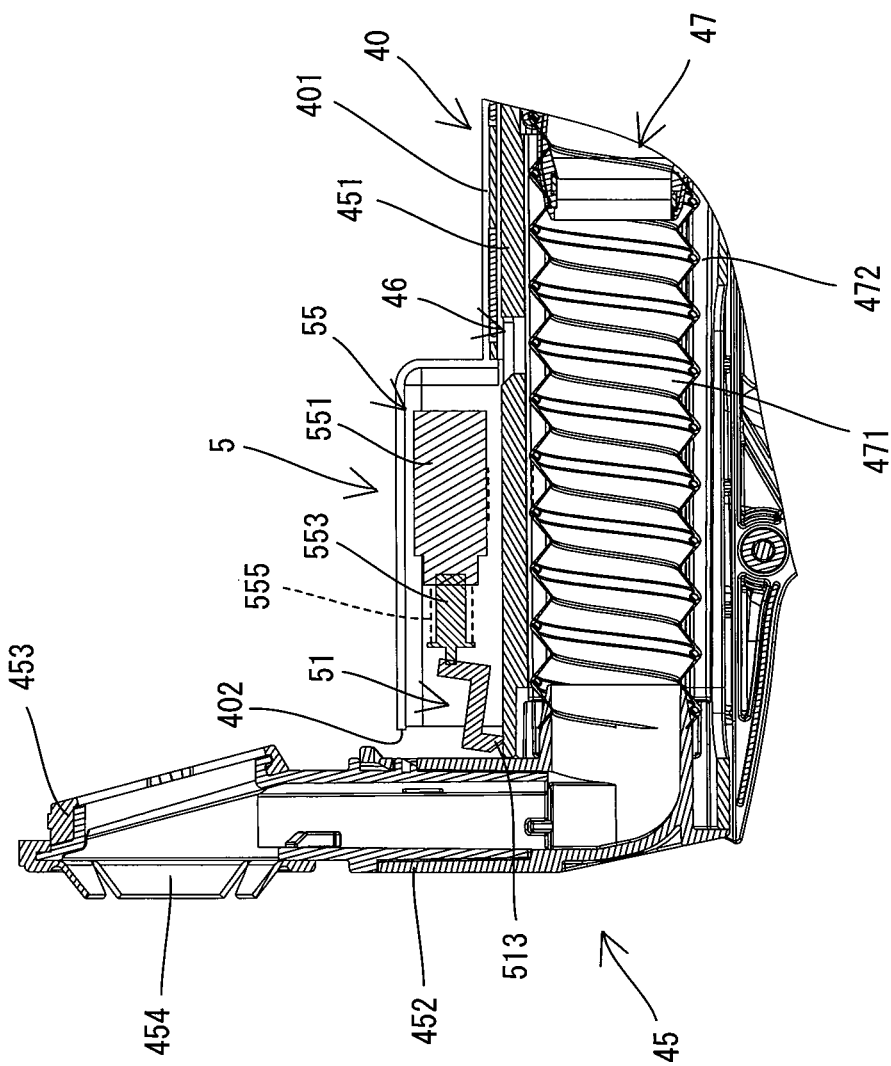
FIG. 7 is a partial sectional view of the dust collector in a state that the sliding part is located in a rearmost position.

Further, when the sliding part 45 is located in a position other than the intermediate position (i.e. when the sliding part 45 is located between the frontmost position and the intermediate position or between the intermediate position and the rearmost position), as shown, for example, in FIGS. 2 and 7, the lock member 51 moves the plunger 553 slightly rearward against the biasing force of the spring 555 and is held in a position in which the tip end of the projection 513 abuts on the upper face of the first tubular part 451 (i.e. held between the unlock position and the lock position). In this position, the projection 513 cannot lock the sliding part 45 relative to the body housing 40. Therefore, the sliding part 45 is allowed to move in the front-rear direction relative to the body housing 40.

Usage of the dust collecting system 1 having the above-described structure is now described, using an example where a drilling operation is performed on a workpiece (such as a concrete wall) (in other words, an example where the hammer drill mode or the drill mode is selected).

In a case where the sliding part 45 is located in the frontmost position (shown by the solid line in FIG. 1) before start of the drilling operation, the tip end 911 of the tool accessory 91 is not visible to the user since it is covered by the cover part 453. In such a case, the user places the sliding part in the intermediate position and locks the sliding part 45 with the lock member 51. Specifically, the user holds the sliding part 45 and moves the sliding part 45 rearward relative to the body housing 40 against the biasing force of the spring 472. In the meantime, the lack member 51 moves forward toward the recess 46 while sliding on the upper face of the first tubular part 451. As shown in FIG. 5, when the sliding part 45 reaches the intermediate position, the plunger 553 is placed in the frontmost position by the biasing force of the spring 555 and the lock member 51 is placed in the lock position. The lock member 51 engages with the recess 46 with the orthogonal face 515 in abutment with the orthogonal face 462. Thus, the sliding part 45 is locked relative to the body housing 40 in the intermediate position. As shown by the two-dotted chain line in FIG. 1, when the sliding part 45 is located in the intermediate position, the tip end 911 of the tool accessory 91 is exposed to the outside in front of the cover part 453, so that the user can easily position the tip end 911 on a target position of the workpiece by visually checking the position of the tip end 911.

After positioning the tip end 911, the user depresses the trigger 251 of the hammer drill 2. Then the switch 253 is turned on and the controller 27 actuates the solenoid 55. When the solenoid 55 is actuated, as shown in FIG. 6, the lock member 51 moves from the lock position to the unlock position and thus unlocks the sliding part 45. The sliding part 45 returns to the frontmost positon and the cover part 453 is pressed against the workpiece while covering the tip end 911. In the meantime, energization to the coil of the solenoid 55 is stopped, and the plunger 553 biased by the spring 555 moves forward and the lock member 51 turns to a position in which the projection 513 abuts on the upper face of the first tubular part 451.

When actuating the solenoid 55, the controller 27 also starts driving of the motor 413 and rotates the fan 411. Thereafter, the controller 27 starts driving of the motor 21 of the hammer drill 2 and causes the driving mechanism 23 to perform drilling motion (and hammering motion). In other words, in the present embodiment, the dust collector 4 starts air suction before the hammer drill 2 starts the drilling operation. When the tool accessory 91 is rotationally driven and the drilling operation is started, dust sucked together with air through the suction port 454 is transferred to the dust case 43 through the dust-transfer passage 47, and captured by the filter 435 and stored within the dust ease 43.

Figure 8:
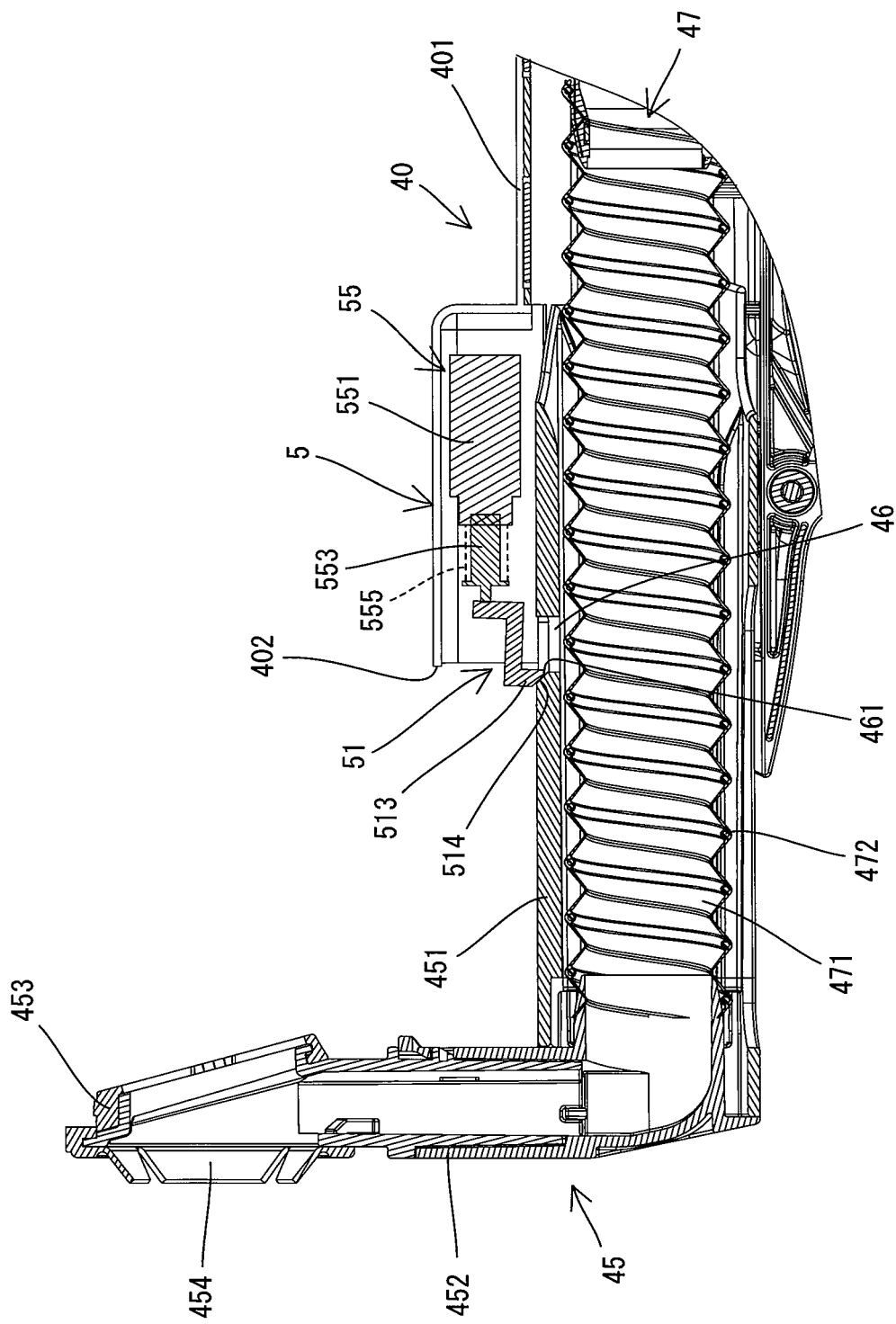
FIG. 8 is a partial sectional view of the dust collector in a state that the sliding part is moved rearward from the intermediate position.

As the drilling operation proceeds with the cover part 453 pressed against the workpiece, the sliding part 45 moves rearward relative to the body housing 40 against the biasing three of the spring 472 while the lock member 51 slides on the upper face of the first tubular part 451. When the sliding part 45 reaches the intermediate position, as described above, the lock member 51 is placed in the lock position and locks the sliding part 45 (see FIG. 5). When the sliding part 45 further moves rearward from this state, the inclined face 514 of the projection 513 abuts on the inclined face 461 of the recess 46. As shown in FIG. 8, when the sliding part 45 further moves rearward, the lock member 51 turns upward and climbs on the upper face of the sliding part 45 (the first tubular part 451) by cooperation of the inclined surfaces 514 and 461, while moving the plunger 553 rearward against the biasing force of the spring 555. Thus, the lock member 51 allows the sliding part 45 to move rearward of the intermediate position when the sliding part 45 is moved rearward relative to the body housing 40.

Thereafter, the sliding part 45 is allowed to move rearward relative to the body housing 40 up to the rearmost position as shown in FIG. 7 while the lock member 51 slides on the upper face of the first tubular part 451. When the sliding part 45 is placed in the rearmost position, the lock member 51 is located on the front end portion of the first tubular part 451. When the user releases the pressing of the cover part 453 against the workpiece in this state, the sliding part 45 moves forward relative to the body housing 40 by the biasing force of the spring 472. The lock member 51 slides on the upper face of the first tubular part 451 until the sliding part 45 reaches the intermediate position. When the lock member 51 reaches the recess 46, the lock member 51 moves to the lock position (see FIG. 5). The lock member 51 engages with the recess 46 with the orthogonal face 515 of the projection 513 in abutment with the orthogonal face 462 of the recess 46. Thus, the sliding part 45 is prevented from further moving forward, so that the sliding part 45 is automatically locked in the intermediate position without returning to the frontmost position.

As described above, the dust collecting system 1 of the present embodiment includes the hammer drill 2 configured to perform a processing operation by driving the tool accessory 91 by power of the motor 21, and the dust collector 4 configured to be attached to the hammer drill 2 to collect dust generated by the processing operation. The dust collector 4 includes the body housing 40, the sliding part 45, the spring 472, the lock member 51 and the solenoid 55. The body housing 40 is configured to be removably attached to the hammer drill 2 (specifically, to the body housing 201). The sliding part 45 is held by the body housing 40 so as to be slidable along the sliding axis A2 extending in the front-rear direction. The sliding part 45 has the cover part 453 on the front end. The cover part 453 has the suction port 454 for sucking dust and configured to cover the tip end 911 of the tool accessory 91. The spring 472 is configured to bias the sliding part 45 forward to hold the sliding part 45 in the frontmost position. The lock member 51 is configured to lock the sliding part 45 relative to the body housing 40 in the intermediate position rearward of the frontmost position. The solenoid 55 is configured to operate in response to a user's operation of depressing the trigger 251 (for starting the motor 21) to unlock the sliding part 45 locked by the lock member 51.

Particularly, in the present embodiment, the lock member 51 is formed in a simple structure of a rotary lever which is supported by the body housing 40 so as to be turnable between the lock position and the unlock position. Further, the solenoid 55 is capable of moving the lock member 51 from the lock position to the unlock position by simple linear motion of the plunger 553. Thus, the lock mechanism 5 for locking and unlocking the sliding part 45 is realized in a compact and simple structure utilizing the lock member 51 and the solenoid 55 as described above.

In the dust collecting system 1 according to the present embodiment, when the trigger 251 is depressed while the sliding part 45 is locked to the body housing 40 in the intermediate position by the lock member 51, the solenoid 55 releases the lock. Accordingly, the sliding part 45, which is biased forward by the spring 472, returns to the frontmost position. Therefore, the user can change the position of the sliding part 45 from the intermediate position to the frontmost position simply by depressing the trigger 251 without needing to perform any operation for the dust collector 4. As described above, the tip end 911 of the tool accessory 91 coupled to the hammer drill 2 is covered by the cover part 453 when the sliding part 45 is located in the frontmost position. While being exposed forward of the cover part 453 when the sliding part 45 is located in the intermediate position. Therefore, the user can position the tip end 911 by visually checking the position of the tip end 911 with the sliding part 45 locked in the intermediate position. Thereafter, simply by depressing the trigger 251, the user can start the motor 21, and cause the tip end 911 to be covered by the cover part 453. Thus, the dust collecting system 1 according to the present embodiment is provided with excellent maneuverability.

Further, in the present embodiment, the solenoid 55 is actuated by the controller 27 before the motor 21 of the hammer drill 2 is started. Therefore, the processing operation can be started with the sliding part 45 already back to the frontmost position and thus with the tip end 911 of the tool accessory 91 covered by the cover part 453.

Further, in the present embodiment, the lock member 51 is configured to allow the sliding part 45 to move rearward of the intermediate position when the sliding part 45 is moved rearward against the biasing force of the spring 472. As described above, in the drilling operation which is performed with the sliding part 45 in the frontmost position and with the cover part 453 pressed against the workpiece, the sliding part 45 moves rearward relative to the body housing 40 against the biasing force of the spring 472 as the drilling operation proceeds. In the present embodiment, when the sliding part 45 is placed in the intermediate position in this process, the lock member 51 is once placed in the lock position. However, the lock member 51 is pressed and moved toward the unlock position by the sliding part 45 moving rearward, and thus allows the sliding part 45 to move rearward beyond the intermediate position. Thus, the lock member 51 does not hinder the progress of the drilling operation.

Further, the lock member 51 is configured to lock the sliding part 45 when the sliding part 45 is moved forward from rearward of the intermediate position by the biasing force of the spring 472 and placed in the intermediate position. As described above, during the drilling operation, the sliding part 45 may move rearward of the intermediate position with the cover part 453 pressed against a workpiece. In such a case, when the user releases the pressing of the cover part 453 against the workpiece, the sliding part 45 automatically returns to the intermediate position and is locked. This saves the user the trouble of locking the sliding part 45 in the intermediate position when positioning the tip end 911 before the next drilling operation.

Correspondences between the features of the above-described embodiment and the features of the invention are as follows. It is noted, however, that the features of the above-described embodiment are mere examples which are non-limiting. The dust collecting system 1 is an example of the "dust collecting system". The hammer drill 2, the motor 21 and the tool accessory 91 are examples of the "power tool", the "motor" and the "tool accessory", respectively. The dust collector 4 is an example of the "dust collector". The body housing 40 is an example of the "body". The sliding part 45, the cover part 453, the suction port 454 and the sliding axis A2 are examples of the "sliding part", the "cover part", the "suction port" and the "sliding axis", respectively. The frontmost position and the intermediate position are examples of the "first position" and the "second position", respectively. The spring 472 is an example of the "biasing member". The lock member 51 is an example of the "lock member" and the "rotary lever". The solenoid 55 is an example of the "actuator" and the "solenoid". The plunger 553 is an example of the "actuation part". The controller 27 is an example of the "control device". One end portion of the lock member 51 which has the projection 513 and the other end portion of the lock member 51 which is connected to the plunger 553 are examples of the "first end portion" and the "second end portion", respectively. The inclined face 514 is an example of the "first inclined face". The recess 46 is an example of the "recess". The inclined face 461 is the "second inclined face". The connector 29 is an example of the "first connector". The connector 415 is an example of the "second connector". The trigger 251 is an example of the "operation member". The switch 253 is an example of the "detecting device".

The above-described embodiment is a mere example, and the dust collecting system according to the present invention is not limited to the structure of the dust collecting system 1 of the above-described embodiment. For example, the following modifications may be made. Further, one or more of these modifications may be applied in combination with the dust collecting system 1 of the above-described embodiment, or with the claimed invention.

In the above-described embodiment, the hammer drill 2 is described as an example of a power tool which is configured to perform a processing operation by driving a removably coupled tool accessory by power of a motor. The power tool which can be adopted in the dust collecting system 1 is not, however, limited to the hammer drill 2, but any power tool may be adopted which may be used for a processing operation (such as a drilling operation and a chipping operation) by which dust may be generated. Examples of such power tools may include a vibration drill, an electric drill acid an electric hammer. Further, a hammer drill having only a hammer drill mode and a hammer mode may be adopted. The dust collector 4 is configured as a device suitable to be used in an operation which is performed with the tip end 911 of the tool accessory 91 covered by the cover part 453 and with the cover part 453 pressed against a workpiece. Accordingly, a drilling tool (such as a hammer drill, a vibration drill and an electric drill) which is configured to perform a drilling operation by rotationally driving a tool accessory around a driving axis may be particularly suitably employed as the power tool.

The internal structure of the hammer drill 2 (such as the structures of the motor 21, the driving mechanism 23 and the controller 27) and its arrangement may be appropriately changed. The motor 21 may be an alternate current (AC) motor. In this case, the hammer drill 2 and the dust collector 4 are operated by power supply from an external commercial power source. In the driving mechanism 23, a motion-converting mechanism using a crank mechanism may be employed, in place of the motion-converting mechanism using a swinging member. Further, the shapes of the body housing 201 and the handle 205 and the connecting structure between them may also be appropriately changed. For example, the body housing 201 and the handle 205 may be elastically connected to be movable relative to each other.

In the above-described embodiment, the fan 411 for generating an air flow for dust collection and the motor 413 configured to rotationally drive the fan 411 are housed in the dust collector 4. The dust collector 4, however, need not include the fan 411 and the motor 413. In this case, a dust-collecting fan may be provided in the hammer drill 2 or other power tool to which the dust collector 4 can be attached, and configured to be rotationally driven by the motor 21 (see, for example, JP2017-221986A). The motor 413 may be a brushless DC motor. In the dust collector 4, the structures and arrangement of the body housing 40, the sliding part 45 and the dust-transfer passage 47 may also be appropriately changed. For example, in place of the spring 472 fitted on the hose 471 which defines a portion of the dust-transfer passage 47, a biasing member (such as a compression coil spring, a leaf spring or a torsion spring) may be provided between the body housing 40 and the sliding part 45 to bias the sliding part 45 forward. Further, the sliding part 45 may be supported outside the body housing 40 so as to be slidable in the front-rear direction.

The attaching/detaching structure between the hammer drill 2 and the dust collector 4 is not limited to the combination of the guide rails 406 and the guide grooves (not shown) of the above-described embodiment. Contrary to the above-described embodiment, such guide rails may be provided on the hammer drill 2 and such guide grooves may be provided on the dust collector 4. Further, for example, a projection may be provided on one of the hammer drill 2 and the dust collector 4, and a recess fittable to the projection may be provided on the other. The direction of attaching and detaching the dust collector 4 relative to the hammer drill 2 may be not the front-rear direction parallel to the driving axis A1, but the up-down direction. Further, the arrangement of the attaching/detaching structure may also be appropriately changed.

In the above-described embodiment is exemplified a case in which the cover part 453 covers the tip end 911 of the tool accessory 91 when the sliding part 45 is located in the frontmost position, while the tip end 911 of the tool accessory 91 is exposed from the cover part 453 when the sliding part 45 is located in the intermediate position. Generally, however, a plural kinds of tool accessories different in length can be attached to the hammer drill 2. In such a case, the intermediate position of the sliding part 45 may be set to a position in which a tip end of a tool accessory of at least one kind is exposed forward from the cover part 453, and more preferably, to a position in which a tip end of the shortest tool accessory is exposed forward from the cover part 453. In particular, the intermediate position may be defined by the position of the recess 46.

Further, the dust collector 4 may be configured such that the position of the sliding part 45 in the front-rear direction relative to the body housing 40 in an initial state (hereinafter referred to as an initial position) can be adjusted according to the length of the tool accessory to be actually attached. Such a mechanism for adjusting an initial position is well known (see, for example, JP2017-221986A) and therefore not described herein. In this case, however, a user may appropriately adjust the initial position with the adjusting mechanism and then lock the sliding part 45 in the intermediate position before depressing the trigger 251 to start a processing operation. In this case, like in the above-described embodiment, when the siding part 45 biased forward returns to the initial position, the processing operation can be started with the tip end of the tool accessory covered by the cover part 453.

The structure of the lock mechanism 5 (the lock member 51 and the solenoid 55) may be appropriately changed. The following changes or modifications may be made to the lock mechanism 5.

The lock mechanism 5 may be provided in a different position in which the lock member 51 can engage with the sliding part 45. For example, the lock mechanism 5 may be provided not in the upper portion of the sliding-guide part 401, but in a side or lower portion thereof.

The lock member 51 may not be a rotary lever, but it may be supported by the body housing 40 so as to be movable in the up-down direction. In this case, the lock member 51 may be movable between a lock position in which the lock member 51 protrudes downward (toward the sliding part 45) and engages with the recess 46 and an unlock position in which the lock member 51 is apart upward from the upper face of the sliding part 45. Upon actuation of the solenoid 55, the lock member 51 may be moved upward to the unlock position. Further, the lock member 51 may be always biased toward the lock position by a biasing member (such as a compression coil spring, a leaf spring or a torsion spring). The lock member 51 may be configured to engage with a projection formed on the sliding part 45 when located in the lock position. The recess 46 may be not a through hole, but a bottomed recess.

Other kinds of actuators (such as an actuator which has an actuation part configured to rotate around an axis) may be employed, in place of the solenoid 55. The solenoid 5 or other kinds of actuators may be configured to act upon the lock member 51 not directly but indirectly via a separate intervening member to move the lock member 51 to the unlock position. Further, in place of the controller 27 of the hammer drill 2, the controller 417 of the dust collector 4 may control operation of the solenoid 55. In this case, the controller 417 may be electrically connected to the trigger 251 or the controller 27 via the connectors 415 and 29 such that the solenoid 55 is actuated when the trigger 251 is depressed and the switch 253 is turned on. The motor 21 of the hammer drill 2 may be controlled by the controller 27. Further, the controller 27 or the controller 417 of the dust collector 4 may actuate the solenoid 55 substantially simultaneously with or after start of the motor 21.

In the above-described embodiment, the specific operation for the hammer drill 2 to start the motor 21 is a depressing operation of the trigger 251. However, a different operation may be employed for the specific operation to start the motor 21. For example, the operation may be an operation of an operation member other than the trigger 251, or pressing the tool accessory 91 against the workpiece. In this case, the hammer drill 2 may include a detecting device for detecting the operation of the operation member or the pressing of the tool accessory 91, and the controller 27 (or the controller 417 of the dust collector 4) may actuate the solenoid 55 based on a detection result of the detecting device.

The kind of the detecting device is not particularly limited. For example, a sensor of a non-contact type (such as a magnetic-field-detection type or an optical type) or a contact-type detecting mechanism (such as a force sensor (load sensor) or a mechanical switch) may be adopted. For example, in a structure in which the body housing 201 and the handle 205 are elastically connected so as to be movable relative to each other in the front-rear direction, the pressing of the tool accessory 91 can be detected based on the position of the handle 205 relative to the body housing 201. Similarly, in a structure in which an internal mechanism of the body housing 201 is configured to move rearward relative to the body housing 201 in response to the pressing of the tool accessory 91, the pressing of the tool accessory 91 can be detected. Further, for example, in a drilling tool in which a tool accessory coupled to a spindle is rotationally driven, the pressing of the tool accessory 91 can be detected based on a rearward pressing force (load) on the spindle.

In view of the nature of the present invention and the above-described embodiment, the following features are provided. One or more of the features can be used in combination with any one or more of the above-described embodiment and its modifications, or in combination with the claimed invention.

(Aspect 1)
The sliding part has a recess or a projection engageable with the lock member placed in the lock position.

The term "recess" may encompass a through hole and a bottomed recess. The recess 46 of the above-described embodiment is an example of the "recess" according to the present aspect.

(Aspect 2)
The lock member is configured to move to the lock position when the sliding part is placed in the second position.

(Aspect 3)
The power tool or the dust collector further includes a control device configured to control operation of the actuator.

The controller 27 of the above-described embodiment is an example of the "control device" according to the present aspect.

(Aspect 4)
The power tool is a drilling tool.

DESCRIPTION OF THE NUMERALS

1: dust collecting system, 2: hammer drill, 201: body housing, 202: driving-mechanism-housing part, 203: motor-housing part, 205: handle, 206: grip part, 207: battery-mounting part, 21: motor, 211: motor shaft, 23: driving mechanism, 239: tool holder, 251: trigger, 253: switch, 27: controller, 29: connector, 4: dust collector, 40: body housing, 401: sliding-guide part, 402: opening, 403: connector part, 405: motor-housing part, 406: guide rail, 408: opening, 411: fan, 413: motor, 414: motor shaft, 415: connector, 417: controller, 43: dust case, 431: inlet, 432: outlet, 435: filter, 45: sliding part, 451: first tubular part, 452: second tubular part, 453: cover part, 454: suction port, 46: recess, 461: inclined face, 462: orthogonal face, 47: dust-transfer passage, 471: hose, 472: spring, 475: hose connecting part, 5: lock mechanism, 51: lock member, 511: lint part, 512: second part, 513: projection, 514: inclined face, 515: orthogonal face, 517: pin, 55: solenoid, 551: case, 553: plunger, 555: spring, 91: tool accessory, 911: tip end, 93: battery, A1: driving axis, A2: sliding axis

What is claimed is:

1. A dust collecting system comprising a power tool and a dust collector, the power tool being configured to perform a processing operation by driving a removably coupled tool accessory by power of a motor, the dust collector being configured to collect dust generated by the processing operation, the dust collector comprising:
    a body configured to be removably attached to the power tool;
    a sliding part held by the body so as to be slidable along a sliding axis, the sliding axis defining a front-rear direction of the dust collector, the sliding part having a front end portion provided with a cover part, the cover part having a suction port for dust and being configured to cover a tip end of the tool accessory;
    a biasing member configured to bias the sliding part forward to hold the sliding part in a first position;
    a lock member configured to lock the sliding part relative to the body in a second position, the second position being rearward of the first position; and
    an actuator configured to unlock the sliding part locked by the lock member, by operating in response to a motor-starting operation for the power tool by a user.

2. The dust collecting system as defined in claim 1, wherein:
    the lock member is supported by the body so as to be movable between a lock position and an unlock position, the lock member being engageable with the sliding part in the lock position and not engageable with the sliding part in the unlock position,
    the lock member is configured to be located in the lock position when the sliding part is located in the second position, and
    the actuator is configured to release the lock by moving the lock member from the lock position to the unlock position.

3. The dust collecting system as defined in claim 2, wherein the lock member is configured to be biased toward the lock position and held to be slidable in the front-rear direction relative to the sliding part when the sliding part is located in a position other than the second position.

4. The dust collecting system as defined in claim 2, wherein:
    the lock member is a rotary lever supported by the body so as to be turnable between the lock position and the unlock position.

5. The dust collecting system as defined in claim 4, wherein:
    the rotary lever has a first end portion and a second end portion, the first end portion being engageable with the sliding part in the lock position, and the actuator is configured to act upon the second end portion to turn the rotary lever to the unlock position, thus disengaging the first end portion from the sliding part.

6. The dust collecting system as defined in claim 5, wherein the rotary lever is turnable around a pivot axis extending in a direction orthogonal to the sliding axis.

7. The dust collecting system as defined in claim 6, wherein:
   a face of the first end portion facing forward when the rotary lever is located in the lock position includes a first inclined face, the first inclined face being inclined rearward toward the sliding part,
   the sliding part includes a recess or a projection engageable with the first end portion,
   a face of the recess or the projection defining a front end of the recess or the projection includes a second inclined face, the second inclined face conforming to the first inclined face, and
   the rotary lever is configured to turn toward the unlock position by sliding contact of the first inclined face and the second inclined face when the sliding part is moved rearward.

8. The dust collecting system as defined in claim 1, wherein the actuator is a solenoid having a linearly movable actuation part.

9. The dust collecting system as defined in claim 8, wherein the actuation part of the solenoid is disposed to directly act upon the lock member in response to the motor-starting operation.

10. The dust collecting system as defined in claim 1, wherein the lock member is configured to lock the sliding part when the sliding part is moved forward from rearward of the second position by a biasing force of the biasing member and placed in the second position.

11. The dust collecting system as defined in claim 1, wherein the lock member is configured to allow the sliding part to move rearward of the second position when the sliding part is moved rearward against a biasing force of the biasing member.

12. The dust collecting system as defined in claim 11, wherein the lock member is configured to be pressed and moved from a lock position toward an unlock position by the sliding part when the sliding part is moved rearward from the second position, thus allowing a rearward movement of the sliding part.

13. The dust collecting system as defined in claim 1, further comprising:
   a control device configured to control operation of the actuator, wherein:
   the control device is configured to actuate the actuator before the motor of the power tool is started.

14. The dust collecting system as defined in claim 13, wherein:
   the power tool and the dust collector includes a first connector and a second connector, respectively, the first connector and the second connector being configured to be electrically connected to each other when the dust collector is attached to the power tool, and
   the controller is provided in the power tool and configured to actuate the actuator via the first connector and the second connector.

15. The dust collecting system as defined in claim 1, wherein the actuator is held by the body.

16. The dust collecting system as defined in claim 1, wherein the motor-starting operation is one of operation of an operation member provided on the power tool or pressing the tool accessory against a workpiece.

17. The dust collecting system as defined in claim 1, wherein
   the lock member is supported by the body so as to be movable between a lock position and an unlock position, the lock member being engageable with the sliding part in the lock position and not engageable with the sliding part in the unlock position,
   the lock member is configured to be located in the lock position when the sliding part is located in the second position, and
   the actuator is a solenoid having a linearly movable actuation part and configured to release the lock by moving the lock member from the lock position to the unlock position.

18. The dust collecting system as defined in claim 17, further comprising:
   a control device configured to control operation of the solenoid, wherein:
   the control device is configured to actuate the solenoid before the motor of the power tool is started.

19. The dust collecting system as defined in claim 18, further comprising:
   a detecting device configured to detect, as the motor-starting operation, one of an operation of an operation member and pressing of the tool accessory against a workpiece, wherein:
   the control device is configured to actuate the solenoid based on a detection result of the detecting device.

20. The dust collecting system as defined in claim 17, wherein the lock member is configured to be placed in the lock position when the sliding part is placed in the second position while the sliding part is moved rearward against a biasing force of the biasing member, and configured to be pressed and moved from the lock position toward the unlock position by the sliding part when the sliding part is further moved rearward from the second position, thus allowing a rearward movement of the sliding part.

* * * * *